Feb. 9, 1926.
R. E. KAISER
1,572,799
DIRIGIBLE HEADLIGHT
Filed April 16, 1925
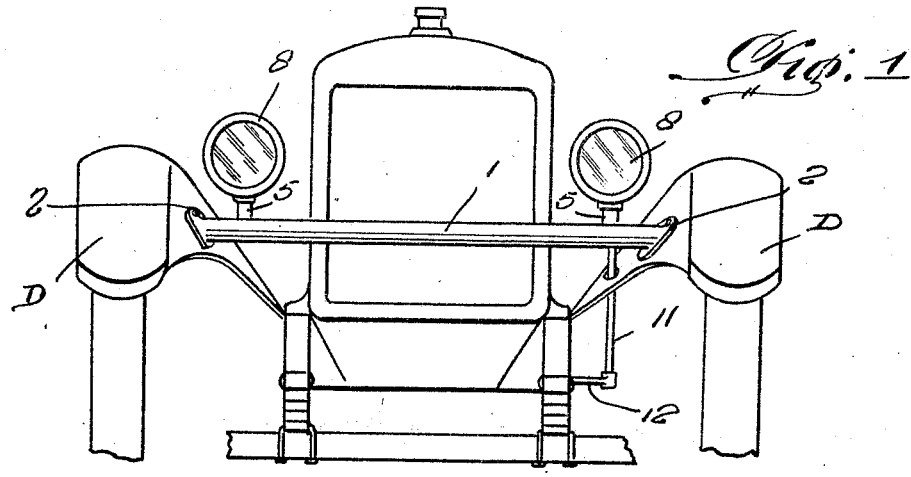
Fig. 1
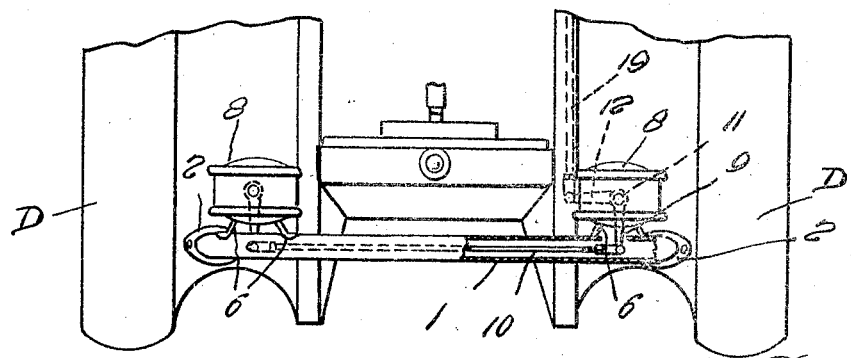
Fig. 2
Fig. 3.
Fig. 4.
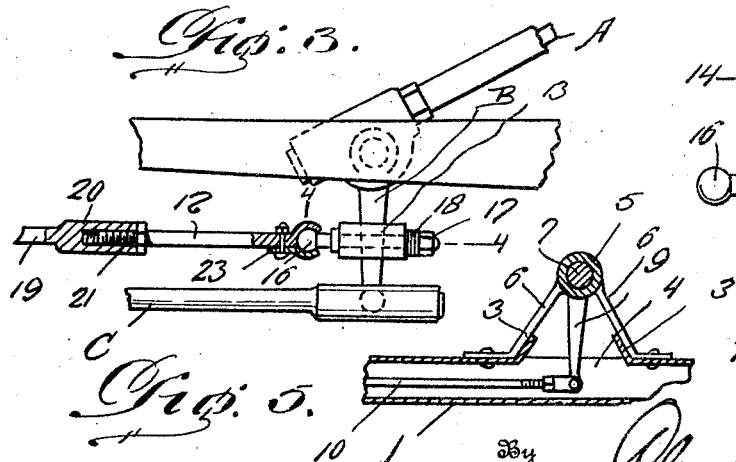
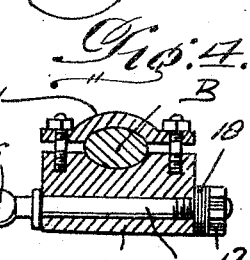
Fig. 5.
Inventor
R. E. Kaiser,
By
Clarence O'Brien
Attorney Patented Feb. 9, 1926.

1,572,799

UNITED STATES PATENT OFFICE.

ROBERT E. KAISER, OF CONEMAUGH, PENNSYLVANIA.

DIRIGIBLE HEADLIGHT.

Application filed April 16, 1925. Serial No. 23,566.

*To all whom it may concern:*

Be it known that I, ROBERT E. KAISER, a citizen of the United States, residing at Conemaugh, in the county of Cambria and State of Pennsylvania, have invented certain new and useful Improvements in a Dirigible Headlight, of which the following is a specification.

This invention relates to improvements in dirigible headlights, such as are employed upon the front end of automobiles and the like.

As is known, in headlight structures of this class, the two headlights are mounted for rotation about a vertical axis, and various means is employed for connecting one of the headlights with the steering mechanism of the vehicle so that upon turning the steering wheel, said one headlight is likewise turned. Connections are employed between the two headlights so that they will operate simultaneously, the angle of movement of the headlights corresponding to the angularity of the front wheels so that the rays of light follow the path of travel of the wheels, whereby to keep the light upon the road at all times.

Broadly construed, my invention operates upon the same principle specified, but it is believed to be an improvement from a structural standpoint in that the details are such as to permit the parts to be reduced to a minimum, to permit loose movement between parts to be taken care of, and to permit other advantageous results to be accomplished.

The various details forming the improved device will become apparent from the following description and drawing.

In the accompanying drawing forming a part of this application and in which like numerals are employed to designate like parts throughout the same:

Figure 1 is a front elevation of the forward portion of an automobile showing my improved dirigible headlight structure mounted thereon.

Figure 2 is a top plan view of the same with portions broken away to disclose the construction more clearly.

Figure 3 is an enlarged detail view showing the particular association of the device with the usual depending steering rod crank.

Figure 4 is an enlarged detail view taken approximately upon the plane of the line 4—4 of Figure 3.

Figure 5 is an enlarged fragmentary sectional and elevational view showing the bearing bracket for the headlight standards.

Referring to the drawings in detail, the reference character A designates the rotary encased rod leading downwardly from the usual hand wheel (not shown), and serving to operate the depending crank arm B of customary design. The crank arm (see Figure 3) is connected with the forwardly extending steering rod C. Also, for clearness, I have shown the usual wheel fenders D, my invention being constructed for co-operation with these parts.

The invention comprises a tubular rod 1 which is arranged between the fenders D, this rod being formed at its opposite ends with angularly disposed attaching flanges 2 by means of which it is riveted or otherwise fastened to the aprons of the fenders. Observing Figure 5, it will be seen that the tube 1 is slit adjacent its opposite ends, and ears 3 are struck outwardly to provide an opening 4. A bearing bracket 5 is located opposite this opening and the forwardly diverging arm 6 of the bracket fastened at their free ends to the tube. This bracket forms a bearing for the standard 7 of the headlight 8 on the right hand side of the automobile. Crank arms 9 are fastened to the headlight standards, and a rod 10 connects at its ends with these crank arms. In this way the rotation of the headlights is made simultaneous. It will be observed that the connector rod 10 is confined and concealed in the tube 1. Also, this tube constitutes an ideal fender brace, and a mounting for the bearing bracket of the headlight standards. It is only necessary that the headlight standards on the right be extended downwardly as indicated at 11. A crank arm 12 is connected to the lower end of the extended portion 11 (see Figure 1).

Noting now particularly Figures 3 and 4, it will be seen that a special clamp is provided for attachment to the intermediate portion of the depending crank arm B, this clamp comprising a block 13 formed on one side with a seat for reception of one-half of the crank arm (see Figure 4). A clamping plate 14 is bolted to the block to hold the latter in place. The block is formed with a bore, and a bolt 15 extends through this bore, the bolt having a spherical head 16 on one end, and a nut 17 on the opposite end. Washers 18 acting as shims are interposed between the nut and the block, and permits adjustment of the bolt 15.

Extending forwardly from the bolt 15 and connecting with the aforesaid arm 12 is a sectional operating rod, the same comprising a front section 19 having threaded sockets 20 on its rear end into which the threaded end 21 of the remaining section 22 is threaded. The section 22 is provided with a socket including a removable section 23 connected with the ball 16. This construction takes care of the necessary universal action to permit free swinging of the arm B and proper transmission of movement of the headlights.

In operation, when the crank arm B is moved to and fro, in the usual way, the sectional operating rod is moved longitudinally and through the medium of the crank arm 12 and extended standard 11, the headlight carried by the latter is rotated in its bearings. This rotary movement is imparted to the remaining headlight on the other side through the connecting rod 10 and crank arm 9. In this connection I would call attention to the fact that it is very desirable to have these crank arms 9 extend forwardly from the headlights, and to have them substantially concealed. With the arrangement shown, the headlights may thus be set on a line with the radiator, or rearward of the same.

It is thought that the foregoing description taken in connection with the accompanying drawings will enable persons skilled in the art to which the invention relates to obtain a clear understanding of the same. For this reason a more lengthy description is deemed unnecessary.

While the preferred embodiment of the invention has been shown and described, it is to be understood that minor changes coming within the field of invention claimed may be resorted to if desired.

Having thus described the invention, what I claim as new is:—

In a dirigible headlight structure, an elongated tube adapted for connection at its opposite ends to the fenders of an automobile, said tube being provided with securing flanges at its respective ends, a pair of opposed ears struck out from the tube adjacent each end thereof to provide a pair of openings adjacent the respective ends of the tube, a pair of bearings, each bearing having forwardly extending arms, the forward portions of the arms being disposed adjacent the outer sides of the rearwardly disposed ears of each pair, the free ends of the arms being disposed laterally and secured to the tube, whereby the bearings are disposed directly behind the respective openings in the tube, a pair of headlights embodying vertical standards, the upper ends of said standards being rotatable in said bearings, forwardly extending crank arms connected to the standards and extending through the respective openings into the tube, and a connecting rod within the tube connected at its respective ends to the forward ends of the respective crank arms.

In testimony whereof I affix my signature.

ROBERT E. KAISER.